Figure 5:
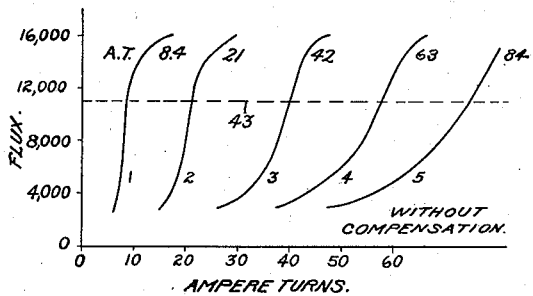

April 4, 1939.       W. KRÄMER       2,153,377
DIRECT CURRENT MEASUREMENT MEANS
Filed Feb. 8, 1938       3 Sheets-Sheet 1
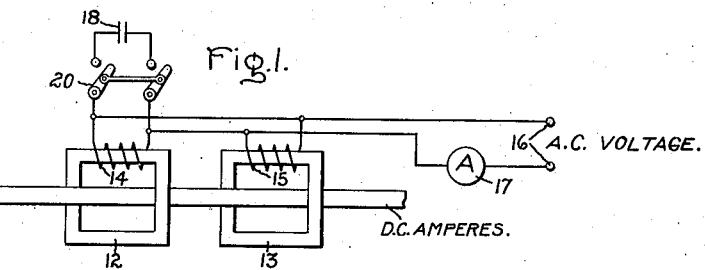
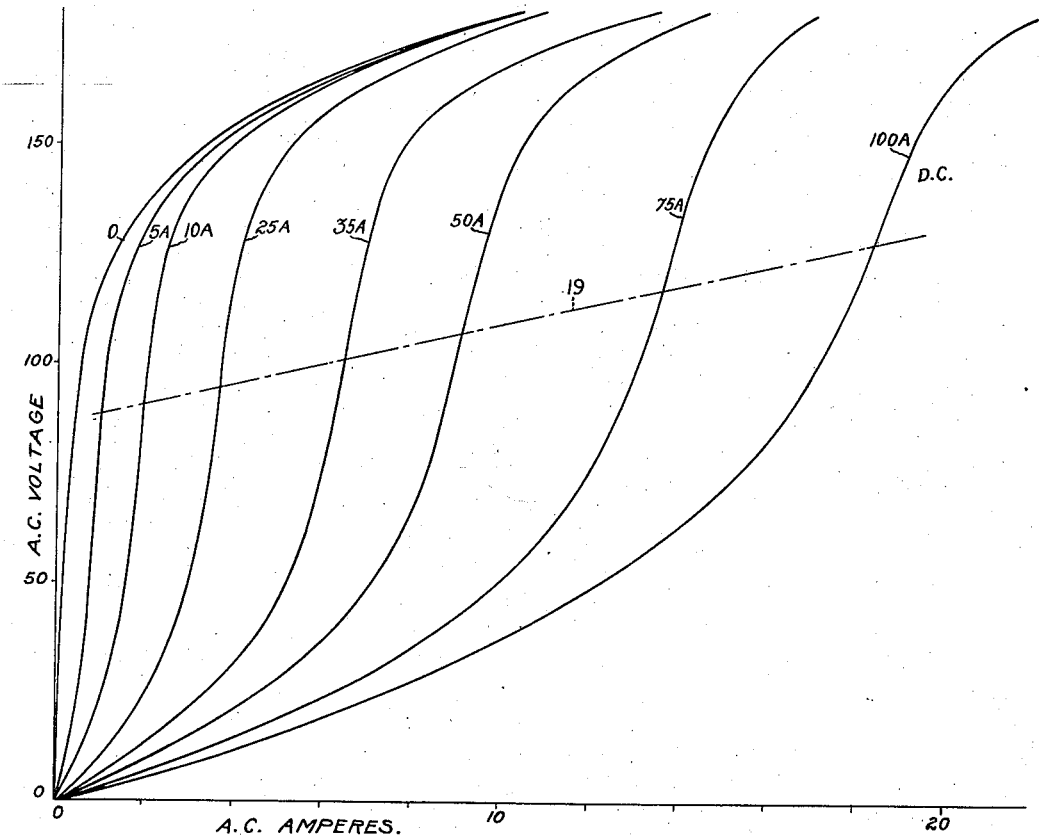
Inventor:
Werner Krämer,
by *Harry E. Dunham*
His Attorney.

April 4, 1939.  W. KRÄMER  2,153,377
DIRECT CURRENT MEASUREMENT MEANS
Filed Feb. 8, 1938   3 Sheets-Sheet 2
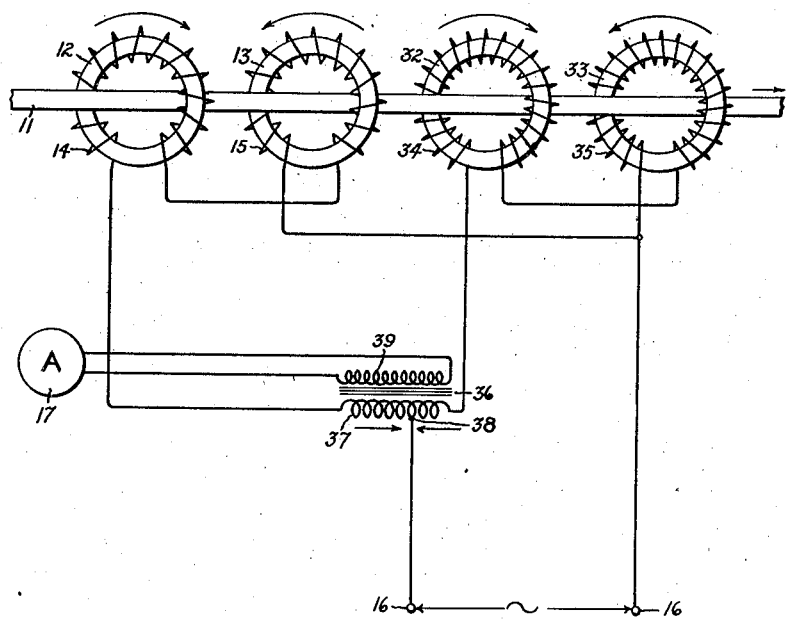
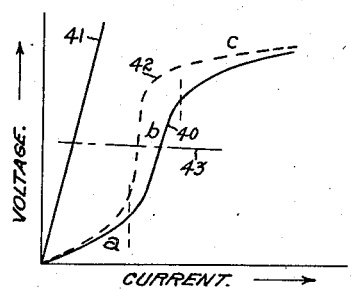
Inventor:
Werner Krämer,
by Harry Dunham
    Attorney.

April 4, 1939. W. KRÄMER 2,153,377

DIRECT CURRENT MEASUREMENT MEANS

Filed Feb. 8, 1938 3 Sheets-Sheet 3

Inventor:
Werner Krämer,
by Harry E. Dunham
His Attorney.

Patented Apr. 4, 1939

2,153,377

UNITED STATES PATENT OFFICE 2,153,377

DIRECT CURRENT MEASUREMENT MEANS

Werner Krämer, Berlin-Karlshorst, Germany, assignor to General Electric Company, a corporation of New York Application February 8, 1938, Serial No. 189,449
In Germany February 26, 1937

5 Claims. (Cl. 171—95)

My invention relates to current-responsive arrangements and concerns particularly improvements in direct-current measurement and direct-current-responsive apparatus. The present application is a continuation in part of my co-pending application Serial No. 154,503 filed July 19, 1937, and assigned to the same assignee as the present application.

In my original application Serial No. 154,503, I described direct-current measuring arrangements of the induction type having magnetic cores, employing alternating-current auxiliary circuits and in which errors were minimized which would tend to result from variation in the auxiliary circuits such as variation in supply voltage and frequency.

One of the features described in my original application was that of so choosing the pressure of the alternating-current source as to bring the alternating-current magnetic induction of the magnetic core material within the range of the point of inflection of the alternating-current magnetization curve, which is obtained with unidirectional magnetization of the core material due to the effect of the direct current being measured.

My present application includes also further improvements for still further diminishing the tendency for errors to result from variation in the auxiliary circuit.

It is accordingly an object of my invention to provide a highly accurate direct-current measuring arrangement which is relatively unaffected by lack of constancy in the source supplying an auxiliary circuit.

It is an object of my invention to provide a direct-current measuring arrangement of the induction type employing an alternating-current auxiliary circuit in which the graph expressing the relationship between the measurement indication and the voltage of the auxiliary circuit for any value of direct-current is substantially flat within the range of expected alternating voltage variations or in which the graph may be given any desired inclination.

It is likewise an object of my invention to provide an arrangement in which second harmonic fluxes are introduced into the core material in order to diminish the effect of fluctuation of alternating voltage.

Other and further objects and advantages will become apparent as the description proceeds.

In accordance with my invention in its preferred form I provide closed cores of magnetic material such as a relatively permeable alloy of iron or other suitable materials. The cores are provided with a direct-current winding which may be a single bar passing through the cores carrying the direct-current to be measured. Alternating-current windings are also provided together with a source of alternating-current and differential current responsive means. One core or set of cores is operated at lower alternating-current flux density than the other core or set of cores and the windings are arranged in opposition so that the current responsive means responds to the difference between the alternating-current inductively related to one core or set of cores and the alternating-current inductively related to the other core or set of cores. The relative strengths of the opposing current effects in the current responsive means are so chosen as to obtain any desired degree of steepness in the curve of alternating voltage plotted against resultant alternating-current effect.

Figure 8:
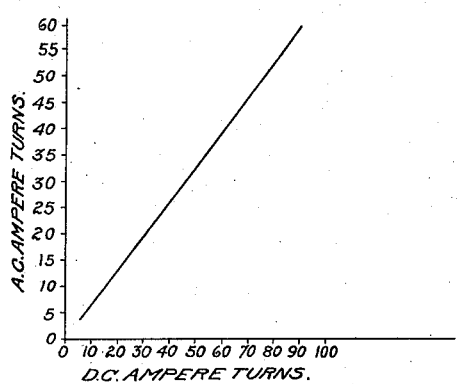
Figure 6:
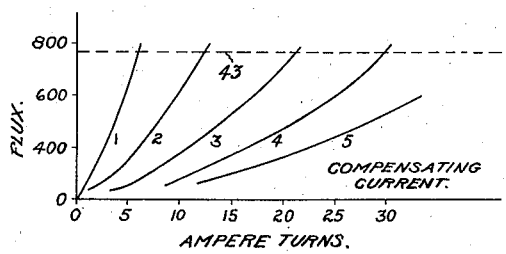
Figure 9:
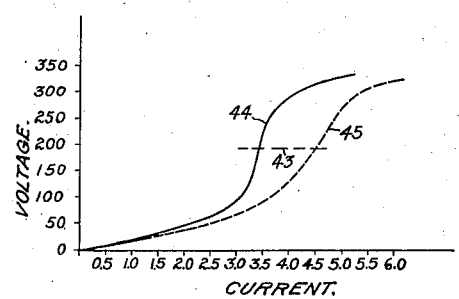
Figure 7:
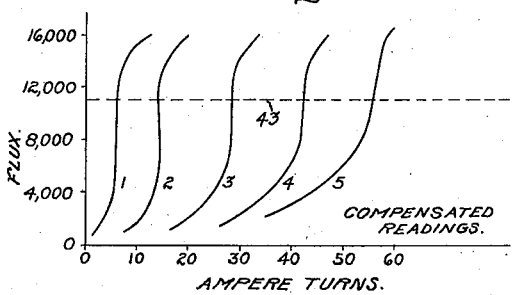

The invention will be understood more readily from the following detailed description when considered in connection with the accompanying drawings and those features of the invention which are believed to be novel and patentable will be pointed out in the claims appended hereto. In the drawings Fig. 1 is a schematic diagram of one embodiment of my arrangement for minimizing alternating-current voltage effects by bringing the operation within the range of the point of inflection of the alternating-current magnetization curve; Fig. 2 is a graph illustrating the relationship between the induced or applied alternating voltage and the alternating-current flowing in the alternating-current windings for different values of current in the direct-current winding of the arrangement of Fig. 1; Fig. 3 is a schematic diagram of one embodiment of the form of my invention in which further refinement in the independence of the measurement from fluctuation in voltage of the auxiliary alternating-current source is obtained; Fig. 4 is a graph explaining the principle of operation of the apparatus of Fig. 3 and showing the curves expressing the relationship between alternating voltage and the currents in the branch alternating current circuits as well as the net alternating-current effect; and Figs. 5–9 inclusive are additional graphs explaining the operation of the apparatus of Fig. 3; Fig. 5 consists of the family of curves expressing the relationship between alternating flux density and alternating ampere turns of the left-hand pair of cores in Fig. 3 for various values of direct-current, thus showing the operation without the compensation provided in the complete arrangement of Fig. 3 or operation analogous to that of Fig. 1. Fig. 6 consists of a corresponding family of curves expressing the relationship between flux density and compensating current for the right-hand pair of cores of Fig. 3. Fig. 7 consists of the family of curves resulting from combining the curves of Figs. 5 and 6 to give the relationship between alternating voltage and resultant current effect or indicated measurement. Fig. 8 is a calibration curve showing the relationship between alternating-current ampere turns and direct-current ampere turns, i. e. between the measurement indicated and the magnitudes of direct current to be measured. Fig. 9 is a graph illustrating the effect of second harmonics in increasing the steepness of the curve expressing the relationship between alternating voltage and alternating-current. Like reference characters are used throughout the drawings to designate like parts.

Referring more in detail to the arrangement shown in Fig. 1, while only one core may be used, in this instance, I have provided two magnetic cores with oppositely wound alternating-current windings in order to obviate alternating-current induction in the direct-current circuit. The direct-current winding is represented by a single bar 11 passing through and linking two closed magnetic cores 12 and 13. The magnetc cores 12 and 13 are provided also with alternating-current windings 14 and 15, respectively, reversely connected so as to have opposite effects on the cores 12 and 13. The windings 14 and 15 are connected to a source of alternating current 16, and an alternating-current ammeter or other current-responsive measuring instrument 17 is connected in the circuit. In the arrangement shown, the windings 14 and 15 are in parallel. If desired, in connection with the measurement of extremely high currents, a condenser 18 may also be connected in the alternating-current circuit in order to improve the power factor and thereby decrease the burden of the alternating-current circuit. The purpose of the arrangement is to measure direct current in the bar 11 by the reading of the ammeter 17 and, as explained hereinafter, obtaining the most accurate results depends upon the proper magnetization of the magnetic cores.

It has been found that the relationship between voltage plotted in the vertical direction and current plotted in the horizontal direction in the alternating-current circuit of Fig. 1 without condenser 18 connected is as shown in Fig. 2 wherein the various curves represent the variation in the alternating-current magnetization curves for various values of unidirectional magnetization of the core produced by the values of direct-current in the bar 11 designated by the numerals adjacent the successive curves. Thus, at 100 volts A. C., about ½ ampere flows in meter A when there is no D. C. current in bar 11 and about 4 amperes flow in meter A when 25 amperes D. C. flow in bar 11. It will be understood, of course, that the numerical values of current and voltage depend upon the number of turns, dimensions, etc., of the electrical and magnetic elements.

The dotted line 19 is drawn through the points of inflection of the curves of Fig. 2, that is, through the points of maximum slope or greatest steepness. It will be seen that the line 19 is substantially a straight line. In normal ferrosilicon alloy, the line 19 lies between values corresponding to the range between ten and thirteen thousand gausses alternating-current induction in the cores 12 and 13. Although the horizontal ordinate is plotted in terms of the alternating-current circuit, it will be understood, of course, that the voltage is proportional to the flux strength or magnetization and, therefore, the voltage values represent magnetization in gausses. The ratio of alternating-current ampere turns to direct-current ampere turns is found to be nearly constant at 1.1.

Accordingly, for the best results the cores 12 and 13 are operated at a flux density falling within the range of the points of inflection of the alternating-current magnetization curves.

In the arrangement of Fig. 3, the magnitude of the alternating-current measured by the instrument 17 is made still further independent of the alternating voltage by adding an auxiliary current which bears the same relationship to the voltage as the main alternating current in the vicinity of the point of inflection of the magnetization curve but is displaced 180 degrees from the main alternating current. As in Fig. 1 there is an inductive system responsive to direct-current, consisting of magnetic cores 12 and 13 in inductive relation to a winding in the form of a rod 11 carrying direct-current to be measured, opposing alternating-current windings 14 and 15, a source of alternating-current 16, and an alternating-current device such as an alternating-current ammeter 17. In this case, however, the alternating-current windings 14 and 15 are shown connected in series. The connections, of course, are such that the windings 14 and 15 act in opposition.

For supplying a compensating or equalizing alternating-current an auxiliary inductive system is provided which is also in inductive relation to the direct-current winding or rod 11. In this case the auxiliary system is like the main system in that it consists also of a pair of cores 32 and 33 surrounding the rod 11 and carrying alternating-current windings 34 and 35 which are connected in opposition to the alternating-current source 16. The windings 34 and 35 may be connected in either series or parallel but are shown connected in series and the series pair 34—35 is in parallel with the series pair 14—15. The auxiliary inductive system, however, is so arranged preferably that the cores 32 and 33 operate relatively low on the saturation curve. The windings 34 and 35 may have a greater number of turns than the windings 14 and 15, thus taking a smaller magnetizing current. The directions of the magnetic fluxes due to the alternating-current circuits at any given instant are as shown in the arcuate arrows.

For differentially combining the alternating-currents in the parallel branches in Fig. 3, a current transformer 36 is employed having a primary winding 37 divided by a tap 38 into two portions through which the respective currents of winding pairs 14—15 and 34—35 flow in opposite directions. The transformer 36 has also a secondary winding 39 connected to the alternating-current instrument 17. The tap 38 may divide the transformer winding 37 unequally in order to obtain the desired relationship between the strength of the effects of the currents in winding pairs 14—15 and 34—35.

The manner in which the connections of Fig. 3 bring about an equalizing or compensating effect may be seen from Fig. 4, in which alternating-current voltage of the source 16 is plotted in a vertical direction against alternating current plotted in a horizontal direction. Curve 40 represents the relationship between the applied voltage and the current in the winding pair 14—15. Curve 41 is the voltage-current curve for the winding pair 34—35 and curve 42 is the resultant representing the reading obtained from the ammeter 17. All three curves are for a given value of direct current in the rod 11. It will be seen that the curve 40 is quite steep within the range of the point of inflection indicated by the line 43 but not vertical. The curve 41 on the other hand, being for a condition well below saturation is substantially linear all the way. Since the curve 40 is substantially linear within the range of the point of inflection, the resultant curve 42 is practically vertical within the range of the point of inflection. By varying the slope of the curve 41 the working portion of the curve 42 may be made exactly vertical or may be given any desired inclination. The slopes of the alternating voltage-current characteristics of the two opposing current effects are made substantially alike in the probable operating range of alternating voltages. The relative slope of the curve 41 or the relative effect of the equalizing current in the winding pair 34—35 is, of course, adjusted by adjusting the position of the tap 38 on the transformer primary 37. It will be understood that saying that the curve 42 is vertical is merely another way of saying that the measuring apparatus gives a flat response to variations in alternating voltage, and curve 42 shows that voltage fluctuation introduces no errors in measurement within a considerable voltage range.

For satisfactory compensation, the auxiliary current flowing in the winding 34—35 should satisfy two conditions:

First, that the auxiliary current vary approximately linearly with voltage variation.

Second, that when the alternating voltage is constant, the auxiliary current vary approximately linearly with variation in direct-current magnetization.

These conditions are found to be fulfilled when the cores 32 and 33 resemble the cores 12 and 13, but are operated at lower flux density.

To show the characteristics of the apparatus of Fig. 3 for different values of direct-current in the rod 11, the families of curves in Figs. 5, 6 and 7 are presented. In these curves, for convenience, alternating-current flux density has been plotted along the vertical axes against alternating-current ampere turns plotted along the horizontal axis. However, the curves of Figs. 5, 6, and 7 correspond to curves 40, 41 and 42, respectively of Fig. 4. The curves numbered 1 to 5 each correspond to a different value of direct-current and the curves bearing the same number in Figs. 5, 6 and 7 are obtained with the same value of direct-current. The actual values of direct-current ampere turns (A. T.) for the numerical example presented are given by the row of figures at the upper ends of the curves in Fig. 5.

The curve 41 corresponds to the lower portion $a$ of the curve 40. However, if desired, a certain degree of compensation could also be effected by operating the cores 32 and 33 at very high alternating-current flux density so as to make the curve 41 correspond to the portion C of the curve 40.

In cases where independence of alternating voltage is needed for only one value of direct-current as in certain type relays, e. g., it is sufficient to connect a condenser of suitable size in parallel with the alternating-current winding, as represented by the condenser 18 in Figure 1. The condenser current will be included in the instrument reading, and will, of course, subtract from the reactive current of the transformer winding. Such compensation, while correcting effects of variation in alternating voltage, cannot be dependent in its absolute value upon the direct-current and is thus suitable only for apparatus in which the direct current is to be held at a substantially constant value.

A particularly low dependency of the reading of the apparatus upon alternating voltage is obtained when alternating-current windings of the cores 12 and 13 are connected in series as shown in Fig. 3 and not in parallel as shown in Fig. 1. By reason of the series connection, the second harmonic, which arises when a magnetic core is subjected to unidirectional premagnetization, cannot occur in the current since the second harmonic quantities for the two cores are in phase opposition. In consequence, the second harmonic must appear in the magnetic fluxes. Such second harmonic fluxes reduce the necessary magnetization from 25 to 30 per cent and increase the steepness of the alternating-current magnetization curve, accompanying unidirectional premagnetization to such an extent that even without the compensating circuit 34—35, the voltage dependency of the alternating-current magnetizing current is halved at the point of inflection of the alternating-current magnetization curve.

This is illustrated in Fig. 9, giving the alternating-current magnetization curves for a given value of direct-current, alternating voltage being plotted along the vertical axis and alternating-current along the horizontal axis. Curve 44 is that for series connection, i. e., with the second harmonic in the flux, and curve 45 is that for parallel connection, i. e., with the second harmonic in the current. It is apparent that by employing both the series connection and the compensating circuit of Fig. 3, it becomes particularly easy to give the portion $b$ of the curve 42 in Fig. 4 any desired degree of steepness or to make it vertical, thus obtaining complete voltage compensation in the vicinity of the point of inflection 43.

I have herein shown and particularly described certain embodiments of my invention and certain methods of operation embraced therein for the purpose of explaining its principle and showing its application, but it will be obvious to those skilled in the art that many modifications and variations are possible and I aim, therefore, to cover all such modifications and variations as fall within the scope of my invention which is defined in the appended claims.

What I claim as new and desire to obtain by Letters Patent of the United States is:

1. Direct-current-responsive apparatus comprising a conductor adapted to carry direct-current to be measured, a pair of magnetic cores in inductive relation to said direct-current conductor, a source of alternating-current, a pair of alternating-current windings in inductive relation respectively to said cores but connected in opposition to said source of alternating-current, a second pair of magnetic cores in inductive relation to said direct-current conductor, a second pair of alternating-current windings in inductive relation respectively to said second pair of cores and also connected in opposition to said source of alternating current, the design being such that the second pair of cores operates at lower alternating current flux density than the first pair, a current transformer having a secondary winding and a primary winding divided into two portions, an alternating current responsive instrument connected to said secondary winding, one of said portions of the primary winding of the transformer being interposed between said source of alternating-current and one pair of said alternating-current windings, the other portion of the primary winding of said transformer, being interposed in circuit between the source of alternating-current and the other pair of alternating-current windings, the connections of the transformer primary winding being such that portions thereof act in opposition, the relative number of turns of the portions of the primary winding being such that the slopes of the alternating-voltage-current characteristics of the two opposing current effects are substantially alike in the probable operating range of alternating voltages, thus making response relatively independent of variation in voltage of the alternating-current source.

2. Direct-current-responsive apparatus comprising a conductor adapted to carry direct-current to be measured, a pair of magnetic cores in inductive relation to said direct-current conductor, a source of alternating-current, a pair of alternating-current windings in inductive relation respectively to said cores but connected in opposition to said source of alternating-current, a second pair of magnetic cores in inductive relation to said direct-current conductor; a second pair of alternating-current windings, in inductive relation respectively to said second pair of cores, and also connected in opposition to said source of alternating-current, the design being such that the second pair of cores operates at lower alternating-current flux density than the first pair, and alternating-current responsive means differentially responsive to the currents drawn by the first and second pairs of alternating-current windings, said differential means being so designed as to oppose such a proportion of one current against the other as to make the slopes of the alternating-current voltage-current characteristics of the two opposing current effects substantially alike in the probable operating range of alternating-current voltages, thus making response relatively independent of variation in voltage of the alternating-current source.

3. Direct-current-responsive apparatus comprising a conductor adapted to carry direct-current to be measured, a pair of magnetic cores in inductive relation to said direct-current conductor, a source of alternating-current, a pair of alternating-current windings in inductive relation respectively to said cores but connected in series opposition to said source of alternating-current, an induction type compensating device having a pair of opposing windings in inductive relation to magnetic core material and also connected to said source of alternating-current, the design being such that the core material of the compensating device operates at lower alternating current flux density than the first pair of magnetic cores, and alternating-current responsive means differentially responsive to the currents drawn by the first and second pairs of alternating-current windings, said differential means being so designed as to oppose such a proportion of one current against the other as to make the slopes of the voltage-current characteristics of the two opposing current effects in the differential responsive means substantially alike in the probable operating range of alternating voltages, thus making response relatively independent of variation in voltage of the alternating-current source.

4. Direct-current-responsive apparatus comprising a principal induction device and a compensating induction device having alternating-current windings, a source of alternating-current energizing said windings and alternating current responsive means differentially responsive to currents drawn by said windings from the alternating-current source, said induction devices including in addition to the alternating-current windings magnetic core material to which the windings are in inductive relation, and direct-current windings in inductive relation to the core material and adapted to carry direct-current to be measured, the design being such that the core material in the principal induction device operates in the relatively steep middle portion of the magnetization curve and the core material in the compensating device operates in the substantially linear initial portion of the magnetization curve.

5. Direct-current-responsive apparatus compensating a principal induction device and an auxiliary induction device, a differential alternating-current responsive means and a source of alternating-current, each of the said induction devices comprising alternating-current and direct-current windings and magnetic core material in inductive relation thereto, the direct-current windings being adapted to carry direct-current to be measured, the alternating-current windings being energized by said source of alternating-current and being so connected as to draw opposing currents, said alternating-current responsive means being interposed in circuit with said alternating-current source so as to be differentially responsive to the currents drawn by said alternating-current windings, the design of said induction devices being such that the core material of the principal induction device operates in the relatively steep middle portion of the alternating-current magnetization curve, and the core material of the auxiliary induction device operates in the relatively flat linear portion of its magnetization curve and the relative impedances being such that the currents drawn thereby are in such a relation that the actual slopes of the magnetization curves of the core material in the two induction devices are substantially equal within the range of direct-current measurements to be made.

WERNER KRÄMER.